US010117289B2

(12) United States Patent
Liu et al.

(10) Patent No.: US 10,117,289 B2
(45) Date of Patent: Oct. 30, 2018

(54) MAINTAINING NETWORK CONNECTIONS FOR BACKGROUND APPLICATIONS

(71) Applicant: Apple Inc., Cupertino, CA (US)

(72) Inventors: Albert S. Liu, Cupertino, CA (US); Padmavathy Bhooma, Cupertino, CA (US); Vincent Lubet, Cupertino, CA (US); Amit K. Vyas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 300 days.

(21) Appl. No.: 14/732,029

(22) Filed: Jun. 5, 2015

(65) Prior Publication Data

US 2016/0360569 A1    Dec. 8, 2016

(51) Int. Cl.
| | | |
|---|---|---|
| *H04W 76/04* | (2009.01) | |
| *H04W 76/06* | (2009.01) | |
| *H04W 76/25* | (2018.01) | |
| *H04W 76/38* | (2018.01) | |
| *H04W 76/27* | (2018.01) | |

(52) U.S. Cl.
CPC ......... *H04W 76/25* (2018.02); *H04W 76/045* (2013.01); *H04W 76/046* (2013.01); *H04W 76/068* (2013.01); *H04W 76/27* (2018.02); *H04W 76/38* (2018.02)

(58) Field of Classification Search
CPC ............. H04W 76/045; H04W 76/068; H04W 76/046
See application file for complete search history.

(56) References Cited

U.S. PATENT DOCUMENTS

| 8,028,060 B1 * | 9/2011 | Wyld .................... G06F 9/4843 709/203 |
| 2013/0007484 A1 * | 1/2013 | Gobriel ................ G06F 1/3209 713/320 |
| 2014/0129674 A1 * | 5/2014 | Matsuda ............... H04L 69/321 709/217 |
| 2015/0131453 A1 * | 5/2015 | Tofighbakhsh ... H04W 52/0251 370/241 |
| 2015/0312857 A1 * | 10/2015 | Kim .................. H04W 52/0222 370/311 |

* cited by examiner

*Primary Examiner* — Yemane Mesfin
*Assistant Examiner* — Henry Baron
(74) *Attorney, Agent, or Firm* — Sterne, Kessler, Goldstein & Fox, PLLC

(57) ABSTRACT

In order to reduce latency associated with an application executed by an electronic device, when the application transitions from a runnable mode to a suspended state, the electronic device may receive a request from the application to maintain a connection, which is used by the application to communicate with another electronic device, while the application is in the suspended state. Then, the electronic device may provide an instruction to an interface circuit in the electronic device to maintain the connection for a time interval while the application is in the suspended state. This time interval may exceed a predefined timeout for the connection and/or a task extension time for the application. Moreover, prior to providing the instruction, the electronic device may confirm one or more system safeguards to prevent abuse and to ensure system performance and battery life is not adversely affected by maintaining the connection.

22 Claims, 4 Drawing Sheets

MAINTAINING NETWORK CONNECTIONS FOR BACKGROUND APPLICATIONS

BACKGROUND

Field

The described embodiments relate to techniques for improving communication performance in a wireless network, including techniques for maintaining a network connection for an application that transitions to a suspended state.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard (which is sometimes referred to as 'Wi-Fi®') or Bluetooth® from the Bluetooth Special Interest Group of Kirkland, Wash.), and/or another type of wireless interface.

The networking subsystem can be used to establish connections with other electronic devices. For example, a connection associated with an application may be established with another electronic device. When the application is executed by an electronic device, the connection may be used to wirelessly communicate information with the other electronic device.

Moreover, when the application transitions to a suspend state to reduce power consumption, the electronic device typically discontinues or disables the connection. Hence, when the application transitions back to a runnable mode, the electronic device may need to re-establish the connection. This typically involves a handshake protocol that involves communicating multiple messages between the electronic device and the other electronic device. Consequently, re-establishing the connection may significantly increase latency, and thus may degrade the user's experience when using the electronic device.

SUMMARY

The described embodiments relate to an electronic device that includes: an antenna; an interface circuit that communicates, via the antenna, with another electronic device through a connection; a processor; and a memory that stores an operating system of the electronic device and an application. During operation, the processor executes the operating system and selectively executes the application. When the application subsequently transitions from a runnable mode to a suspended state, the operating system receives a request from the application to maintain the connection while the application is in the suspended state. In response to the request, the operating system provides an instruction to the interface circuit to maintain the connection for a time interval while the application is in the suspended state, where the time interval exceeds at least one of a predefined timeout for the connection and a task extension time for the application.

Note that the request may specify a value of a flag to be set on a socket.

Moreover, when the processor is transitioning to a sleep mode, the processor may instruct the interface circuit to maintain the connection by providing a list of maintained connections to the interface circuit.

Furthermore, when the application transitions from the suspended state to the runnable mode, the application may communicate information through the maintained connection without re-establishing the connection.

Additionally, the operating system may confirm one or more system safeguards and, if the one or more system safeguards are confirmed, may provide the instruction. The one or more system safeguards may include: restricting the application to only requesting to maintain one connection; a power state of a battery in the electronic device; a total available memory; excluding the connection if the connection is associated with a cellular-telephone communication protocol; and/or excluding the connection if the application requests to maintain the connection on behalf of another process executed by the processor.

In some embodiments, the time interval is between 6 and 10 min.

Moreover, the electronic device may receive and accept less than a predefined amount of data from the other electronic device via the connection when the application is in the suspended state. Furthermore, the electronic device may provide an acknowledgment to the other electronic device for the data without transitioning the application from the suspended state to the runnable mode.

Additionally, the electronic device may reduce a Transmission Control Protocol (TCP) window size by an amount of the data that is received until the TCP window size is zero.

Another embodiment provides a computer-program product for use with the electronic device. This computer-program product includes instructions for at least some of the aforementioned operations performed by the electronic device.

Another embodiment provides a method for maintaining a connection, which may be performed by an electronic device. When an application on the electronic device transitions from a runnable mode to a suspended state, the electronic device receives a request from the application to maintain the connection, which is used by the application to communicate with the other electronic device, while the application is in the suspended state. Then, the electronic device provides the instruction to the interface circuit in the electronic device to maintain the connection for the time interval while the application is in the suspended state, where the time interval exceeds at least one of the predefined timeout for the connection and the task extension time for the application.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to reduce latency associated with an application executed by a processor in an electronic device, when the application transitions from a runnable mode to a suspended state, the electronic device may receive a request from the application to maintain a connection, which is used by the application to communicate with another electronic device, while the application is in the suspended state. Then, the electronic device may provide an instruction to an interface circuit in the electronic device to maintain the connection for a time interval while the application is in the suspended state. This time interval may exceed a predefined timeout for the connection and/or a task extension time for the application. Moreover, prior to providing the instruction, the electronic device may confirm one or more system safeguards to prevent abuse and to ensure system performance and battery life are not adversely affected by maintaining the connection.

In this way, this communication technique may improve the performance of the application, such as if the application transitions back to the runnable mode. In particular, if the application transitions back to the runnable mode, the electronic device may not need to re-establish the connection. Instead, the application may be able to use the maintained connection to communicate with the other electronic device without additional delay. Moreover, instead of maintaining the connection all the time for the application (which could adversely impact system performance, battery life and security), by checking the safeguards the communication technique may ensure that the connection is only maintained based on the request from the application when the system is capable of supporting the maintained connection. Consequently, the communication technique may reduce user frustration and, thus, may improve the user experience when using the electronic device.

In general, the information communicated between the electronic devices in the communication technique may be conveyed in packets or frames that are transmitted and received by radios in the electronic devices in accordance with a communication protocol, such as: an Institute of Electrical and Electronics Engineers (IEEE) 802.11 standard, Bluetooth® (from the Bluetooth Special Interest Group of Kirkland, Wash.), a cellular-telephone communication protocol and/or another type of wireless interface. In the discussion that follows, Wi-Fi® is used as an illustrative example, but the techniques may be applied to any communication technology.

Figure 1:
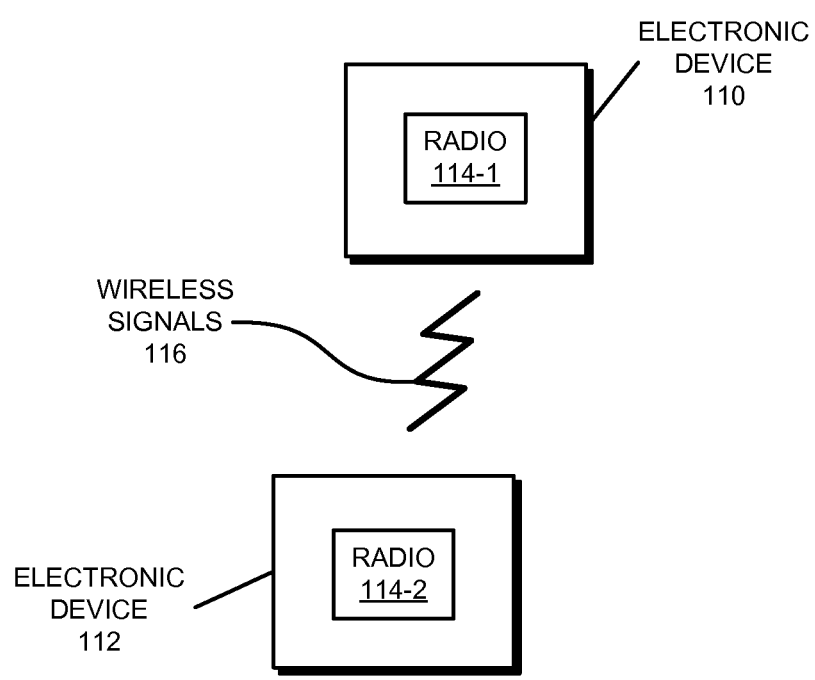
FIG. 1 is a block diagram illustrating electronic devices wirelessly communicating.

The communication between the electronic devices is shown in FIG. 1, which presents a block diagram illustrating electronic devices 110 and 112 wirelessly communicating. In particular, these electronic devices may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads).

Figure 4:
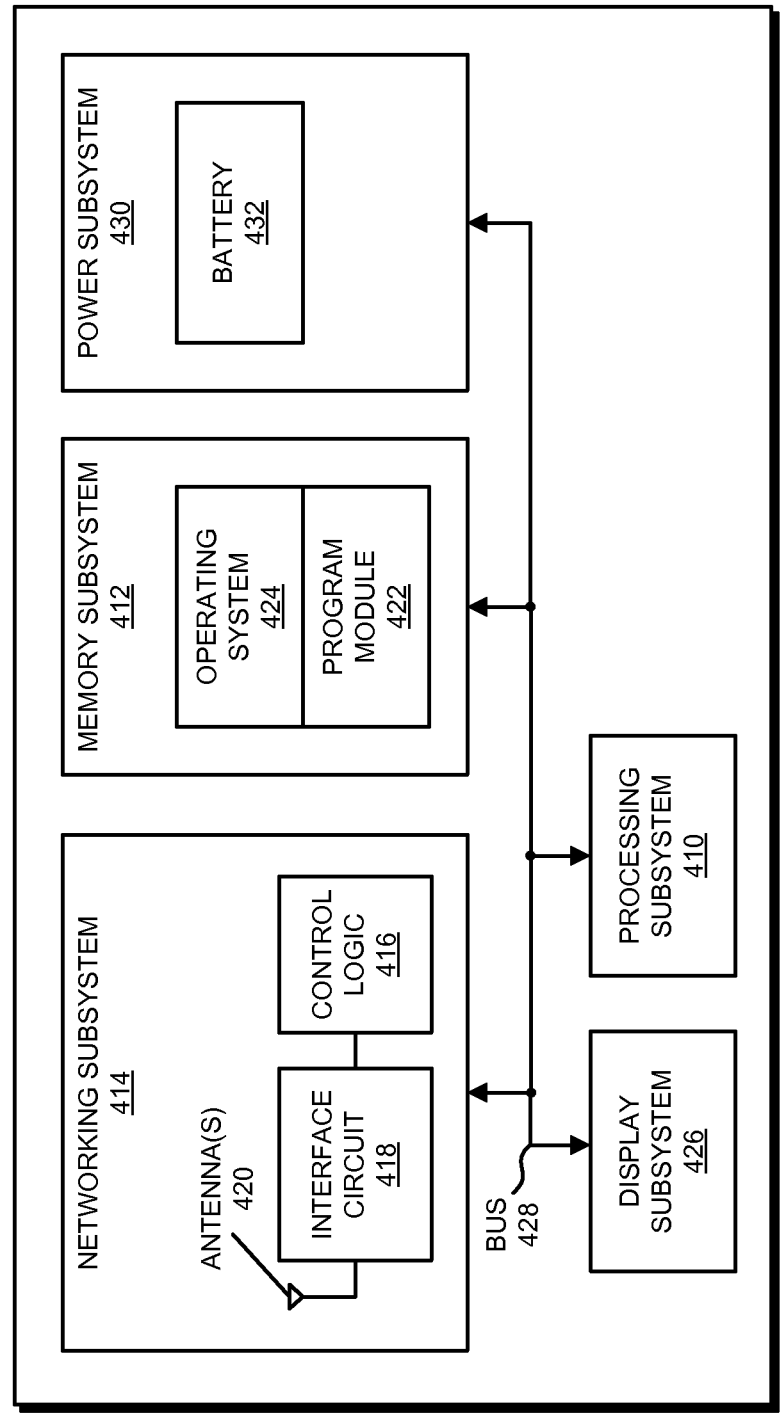
FIG. 4 is a block diagram illustrating one of the electronic devices of FIG. 1 in accordance with an embodiment of the present disclosure.

As described further below with reference to FIG. 4, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with networking subsystems that enable electronic devices 110 and 112 to wirelessly communicate with another electronic device. This can include transmitting beacons on wireless channels to enable electronic devices to make initial contact with or detect each other, followed by exchanging subsequent data/management frames (such as connect requests) to establish a connection (which is sometimes referred to as a 'Wi-Fi connection'), configure security options (e.g., IPSec), transmit and receive packets or frames via the connection, etc.

As can be seen in FIG. 1, wireless signals 116 (represented by a jagged line) are transmitted by a radio 114-1 in electronic device 110. These wireless signals 116 are received by radio 114-2 in electronic device 112. For example, electronic device 110 (such as a cellular telephone) may transmit packets with information to electronic device 112 (such as another cellular telephone or an access point in a wireless local area network or a Wi-Fi network). Alternatively or additionally, electronic device 112 may transmit packets, or other signals, with information to electronic device 110. For example, an application executed by electronic device 110 may transmit data through the connection with electronic device 112.

However, the application may transition from a runnable mode with user focus (such as using a display, accepting audio or tactile input, playing sounds, etc.) to a background mode in a suspended state (which is henceforth referred to as a 'suspend mode'), which is not runnable by the scheduler. (Alternatively, the application may transition to a background mode runnable by a scheduler in which the application may not be able to interact with external resources, e.g., based on an instruction from a processor in the processor subsystem.) Typically, when an application transitions to the suspended state, an interface circuit in the networking subsystem may disconnect (which is also sometimes referred to as 'disable,' 'defunct,' 'tear down,' or 'close') the connection. While this can reduce power consumption and free-up system resources, if the application transitions back to the runnable mode there can be a delay when the connection is re-established.

Accordingly, electronic device 110 may perform the communication technique. As described further below with reference to FIGS. 2 and 3, during this communication technique, when the application transitions from the runnable mode to the suspended state, the application may request to maintain the connection while the application is in the suspended state. For example, the request may include a value of a flag set on a socket associated with the connection. The flag may be set using an application programming interface or API.

In response to receiving the request, the operating system executed by the processor subsystem in electronic device 110 may provide an instruction to the interface circuit to maintain the connection for a time interval while the application is in the suspended state. This time interval may exceed a predefined timeout for the connection and a task extension time for the application. For example, the time interval may be 6-10 min. In other implementations, any other duration or range of durations may be used. Alternatively or additionally, if a processor transitions to a sleep or low-power mode, the processor may provide the instruction by providing a list of maintained connections to the interface circuit.

Subsequently, when the application transitions from the suspended state to the runnable mode, the application may communicate information through the maintained connection without re-establishing the connection.

In order to prevent overuse (such as too many maintained connections) or misuse, and/or to prevent an adverse impact on system performance, before providing the instruction the operating system may confirm one or more system safeguards are satisfied and/or are not violated. If the one or more system safeguards are confirmed, the operating system may provide the instruction. For example, the one or more system safeguards may allow the operating system to confirm that a maximum number N of maintained connections for the application has not been exceeded. In an exemplary embodiment, N is one. Moreover, in some implementations, the providing of the instruction may be gated by one or more system factors, such as the power state of a battery in electronic device 110 and/or total available memory. Thus, if the battery charge and/or the total available memory is less than a predefined level (such as 10%), the connection may not be maintained. Similarly, in some implementations, only certain types of connections may be maintained (e.g., connections associated with a cellular-telephone communication protocol may not be maintained) and/or the application may not be allowed to make the request on behalf of another process executed by the processor.

While the application is in the suspended state and the connection is maintained, electronic device 110 may receive and accept less than a predefined amount of data (such as 128 kB) from electronic device 112 via the connection. When data is received from electronic device 112 via the connection, the interface circuit may provide an acknowledgment to electronic device 112 for the data without transitioning the application from the suspended state to the runnable mode. In addition, electronic device 110 may provide feedback to electronic device 112 to send less data or to slow down the rate at which data is provided to electronic device 110. For example, electronic device 110 may reduce a Transmission Control Protocol (TCP) window size by an amount of the data that is received, e.g., until the TCP window size is zero.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine information contained in the packet or frame (such as the request or additional information in the payload).

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving packets or frames.

Figure 2:
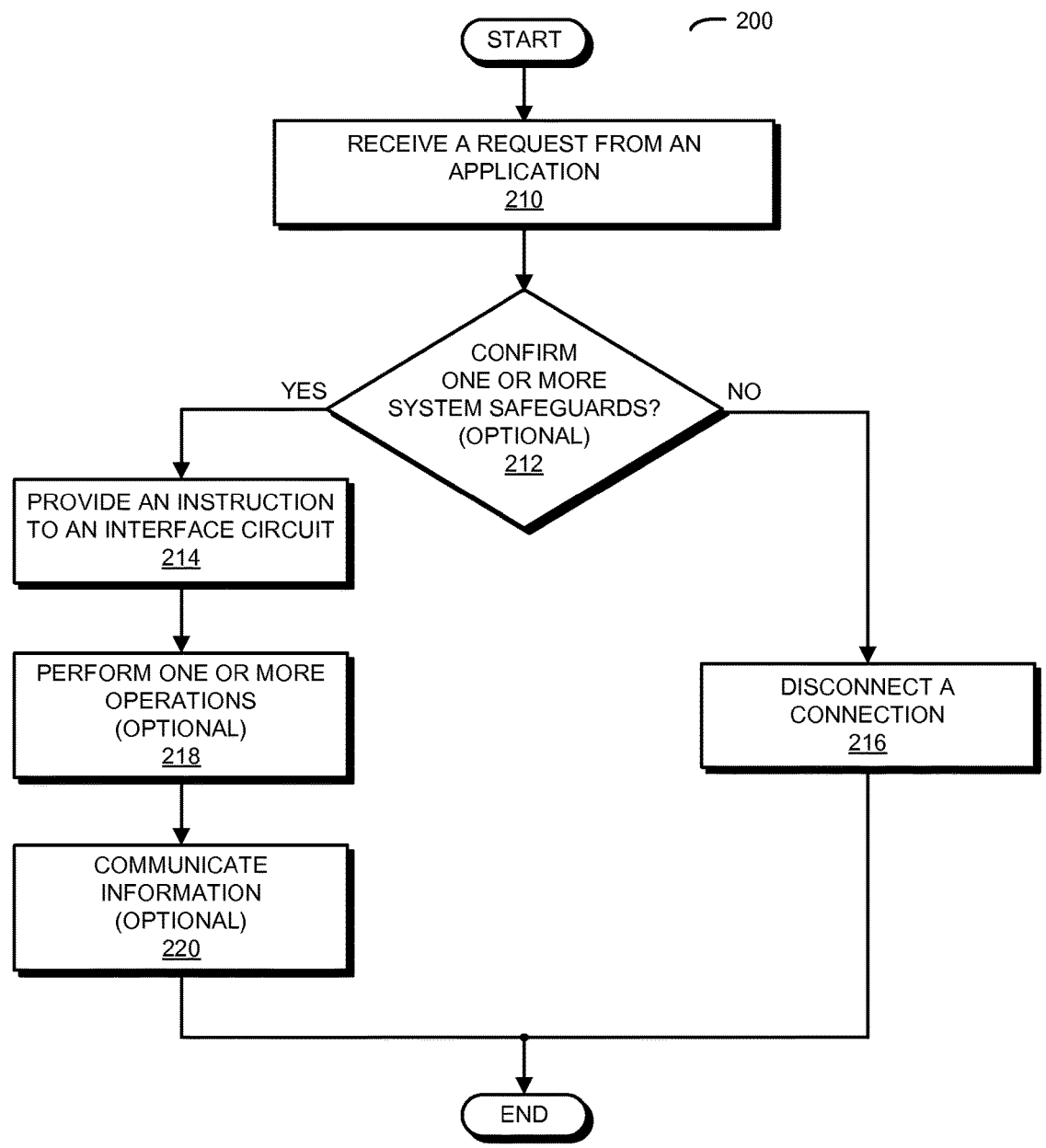
FIG. 2 is a flow diagram illustrating a method for maintaining a connection between electronic devices in FIG. 1.

We now describe embodiments of a method. FIG. 2 presents a flow diagram illustrating method 200 for maintaining a connection between the electronic devices in FIG. 1, which may be performed by an electronic device (such as electronic device 110 in FIG. 1). During operation, when an application transitions from a runnable mode to a suspended state, the electronic device receives a request from the application (operation 210) to maintain a connection, which is used by the application to communicate with another electronic device, while the application is in the suspended state. For example, the request may include a value of a flag set on a socket (such as a socket in the operating system that is associated with the connection).

Then, the electronic device provides an instruction to an interface circuit (operation 214) in the electronic device to maintain the connection for a time interval while the application is in the suspended state, where the time interval exceeds a predefined timeout for the connection (such as 1-2 s) and/or a task extension time for the application (such as 3 min). For example, the time interval may be between 6 and 10 min. In other examples, other time intervals can be used. Note that, when a processor in the electronic device is transitioning to a sleep mode, the processor may instruct the interface circuit (such as the Media Access Control layer) to maintain the connection by providing a list of maintained connections to the interface circuit.

In some embodiments, prior to providing the instruction (operation 214), the electronic device optionally confirms one or more system safeguards (operation 212). If the one or more system safeguards are confirmed (operation 212), the electronic device provides the instruction (operation 214); otherwise, the electronic device may disconnect the connection (operation 216).

For example, an operating system executed by the processor in the electronic device may confirm one or more system safeguards and, if the one or more system safeguards are confirmed, may provide the instruction. Note that the one or more system safeguards may include any or all of: restricting the application to only requesting to maintain one connection; a power state of a battery in the electronic device; total available memory (and, more generally, memory management); excluding the connection if the connection is associated with a cellular-telephone communication protocol; and/or excluding the connection if the application requests to maintain the connection on behalf of another process executed by the processor (thus, a web browser may not request to maintain the connection for a web page). Any other system safeguard or safeguards may be used in addition to or in place of those identified above.

While the application is in the suspended state, the electronic device may perform one or more optional operations (operation 218). For example, the electronic device may receive and accept data, e.g., less than a predefined amount of data (such as 128 kB) from the other electronic device via the connection when the application is in the suspended state. The electronic device may provide an acknowledgment to the other electronic device for the data without transitioning the application from the suspended state to the runnable mode (e.g., the TCP stack in the operating system may send the acknowledgment). In order to dynamically restrict the amount of additional data that can be received, the electronic device may reduce a TCP window size (which advertises how much data the electronic device is ready to receive) by an amount of the data that is received until the TCP window size is zero. Thus, the TCP window size may be progressively reduced from a threshold, e.g., 128 kB, down to zero as the data is received.

Furthermore, when the application transitions from the suspended state to the runnable mode, the application may optionally communicate information (operation 220) through the maintained connection without re-establishing the connection.

In an exemplary embodiment, at least some of the operations in method 200 are performed by an application or a program module that is executed in an environment (such as the operating system) of the electronic device. Alternatively, at least some of the operations in method 200 may be performed by an interface circuit in the electronic device. For example, at least some of the operations may be performed by firmware executed by the interface circuit.

Figure 3:
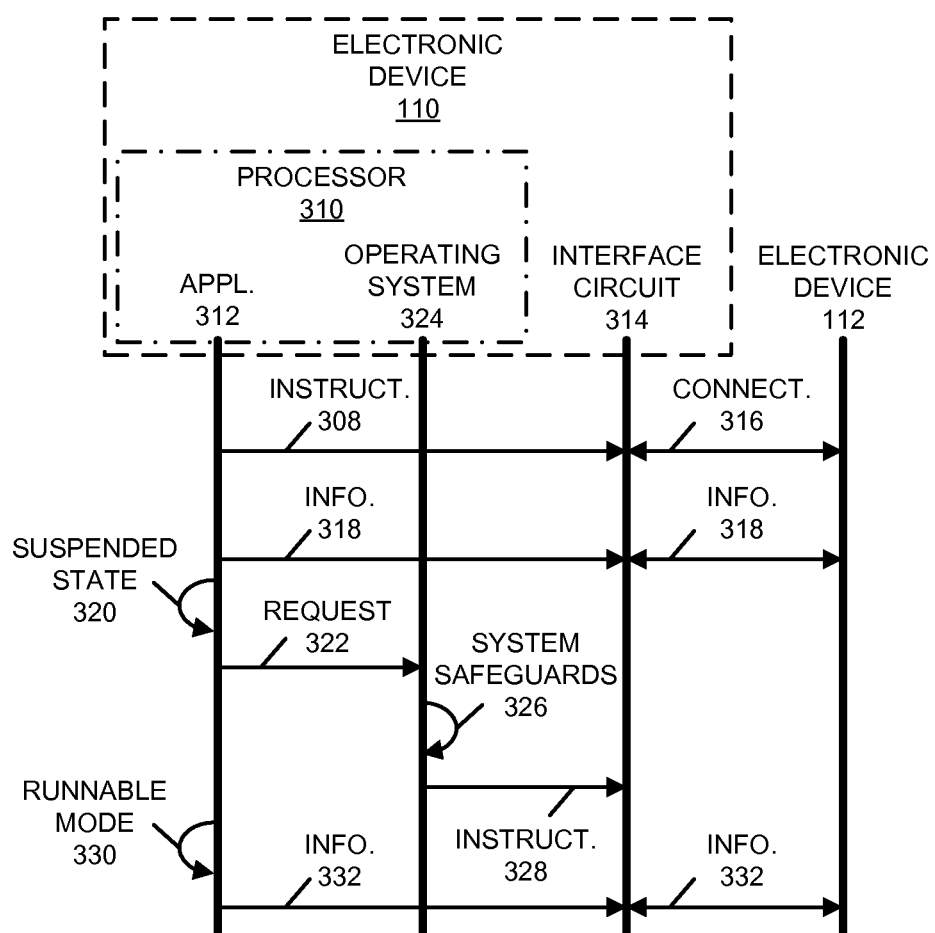
FIG. 3 is a drawing illustrating communication between the electronic devices of FIG. 1.

The communication technique is further illustrated in FIG. 3, which presents a drawing illustrating communication between electronic devices 110 and 112 (FIG. 1). In particular, processor 310 in electronic device 110 may execute an application 312. During execution, application 312 may instruct 308 interface circuit 314 to establish a connection 316 with electronic device 112. Moreover, application 312 may, via interface circuit 314, use connection 316 to communicate information 318 with electronic device 112.

Subsequently, application 312 may transition from a runnable mode to a suspended state 320. When this occurs, application 312 may provide a request 322 to maintain connection 316 while application 312 is in the suspended state. In response, processor 310 (such as an operating system 324 executed by processor 310) may check one or more optional system safeguards 326 are met. If these system safeguards 326 are confirmed, operating system 324 may instruct 328 interface circuit 314 to maintain connection 316 while application 312 is in the suspended state.

Subsequently, when application 312 transitions back to the runnable mode 330, application 312 may, via interface circuit 314, use connection 316 to communicate information 332 with electronic device 112.

In these ways, the communication technique may facilitate fast communication between electronic devices 110 and 112 by maintaining connection 316 when application 312 transitions to the suspended state.

In some embodiments of the preceding method, there may be additional or fewer operations. Moreover, the order of the operations may be changed, and/or two or more operations may be combined into a single operation.

In an exemplary embodiment, extended background idle mode (EBIM) sockets (which are sometimes referred to as 'warm sockets') are used to keep or maintain a connection associated with a TCP socket when an application is suspended or transitioned to a suspended state. In particular, the application may use an API to keep a TCP/Internet Protocol (IP) connection alive for an extended amount of time while the application is in the suspended state. This capability may allow the application to save the cost of re-establishing a connection in order to reduce user-visible lag for applications such as a remote control, for which a user expects an immediate audiovisual feedback (such as displaying the next slide) when the application is resumed and sends a command to a target or a destination.

Typically, one or more sockets may be invalidated when the application is suspended, and the application has to re-establish a new connection when it resumes or transitions back to the runnable mode. However, the number of round trips needed to establish the new connection can result in a significant delay, especially in a congested network environment. For example, when resolving the address of a server using a Domain Name System, there may be one or more round trips (unless the necessary information is cached). This may be followed by a 3-way TCP handshake (another round trip) and/or a complete Secure Socket Layer (SSL) handshake (at least two additional TCP round trips). Furthermore, the application may use its own handshake at the beginning of a connection, which may add more TCP round trips.

Using the API, the application may mark a TCP socket so that it is not invalidated or disconnected when the application is suspended and transitions to the suspended state. When the application resumes and transitions back to the runnable mode, the application can send and receive data over this TCP socket (and the associated TCP connection) without waiting for the connection to be re-established.

When the application marks a TCP socket to be maintained in this way (i.e., to set the EBIM for this socket), the operating system (such as the networking stack) may perform an initial policy check or may confirm one or more system safeguards, such as that: the EBIM has been set on a permissible type of socket (such as a socket associated with a TCP connection), the maximum number of EBIM sockets for the application is not exceeded, the socket is associated with an allowed network interface (e.g., in some embodiments cellular-telephone data is not allowed to use the EBIM), the socket is not delegated from another process (such as a web browser), and/or other criteria. If the initial policy check fails, an error may be returned. Otherwise, the socket data structure in the operating system may record that the application wants to use the EBIM.

Moreover, when the application is suspended or transitions to the suspended state, the network stack may scan for sockets that are currently open for the application, and for which the application may want to use the EBIM. For each of these sockets, a second policy check or confirmation of one or more additional system safeguards may be performed. In particular, the operating system may confirm that: the socket has not been disconnected (i.e., that it is still usable), the socket is connected to an allowed network interface, and/or an application-suspension time policy has not been exceeded. If the application-suspension time-policy check succeeds, the socket may be marked with a flag that indicates that the socket is now in the EBIM and an expiration timer may be started for an adjustable or selectable allowed duration or time interval. Note that the duration of this timer may be adjusted (or reduced) if the battery life is low and/or based on other system constraints (such as the total available memory).

Furthermore, when a socket is in the EBIM, it can still accumulate incoming TCP data and the received data may be acknowledged. However, the application may not be woken up or transitioned back to the runnable mode when this occurs.

If the amount of data that is accumulated for a socket that is in the EBIM exceeds a preset limit (such as 128 kB), the socket may be marked as unusable and the connection may be torn down or disconnected, so that data cannot be sent or received any longer via this socket. In order to prevent a lot of data accumulating on the socket receive buffer, a TCP flow-control mechanism with a reduced TCP receive window may be used to provide feedback to the other electronic device to send less or less-frequent data.

Moreover, if memory pressure increases, the networking stack may decide to free up memory by selecting a socket that is in the EBIM and that has a lot of accumulated data, and disconnecting the associated connection.

Furthermore, if the timer fires when the socket is in the EBIM, then the socket may be marked as unusable, and the associated connection may be disconnected, so that data cannot be sent or received any longer on this socket. When the application resumes or transitions back to the runnable mode before the timer fires, the networking stack may: scan for the sockets currently opened by the application, clear the EBIM flag, and cancel the expiration timer.

The API and the underlying mechanism for EBIM sockets may have characteristics, such as: a public API (which may be accessible via CoreFoundation and NextStep frameworks in Objective-c); handling incoming traffic or received data on the associated connection by providing an acknowledgment without triggering the application to resume (e.g., data in flight from the other electronic device when the application is suspended may be stored so that the other electronic device does not drop the connection); no Network Address Translation keep-alive support and no application keep-alive support (either of which may require that the application resume); no cellular-telephone interface support (which may help prevent abuse); a maximum of N such sockets (such as N equal to one) per application at a given time (which may bound the added power consumption associated with this feature); and/or no guarantee that the connection will still be usable when the application resumes.

The API may be accessible via a higher-level framework that applies a flag to mark a socket (such as a TCP socket) as having the EBIM. In particular, an application can request the EBIM on a TCP socket using a socket option called SO_EXTENDED_BK_IDLE. The option value may be an integer. For example, a value of '0' may disconnect the EBIM on the socket, and any non-zero value may enable the EBIM on the socket if within the policy-limit duration or time interval. The error 'EOPNOTSUPP' may be returned when an attempt is made to set this value on a type of socket that is not supported. Moreover, the error 'EBUSY' may be returned when the application exceeds one of the policy checks or system safeguards (e.g., it exceeds a maximum number of concurrent EBIM sockets per application).

For example, the API may be used to set the EBIM on a socket called "tcp_socket" by setting: int value='1' and error=setsockopt(tcp_socket, SOL_SOCKET, SO_EXTENDED_BK_IDLE, &value).

A media access control (MAC) layer driver can get the set of TCP ports of sockets that are in the EBIM by using the kernel API ifnet_get_local_ports_extended( ) with the flag 'INPCB_GET_PORTS_USED_EXTBGIDLEONLY.' This capability may also allow the MAC layer driver to retrieve the set of open TCP ports in EBIM for a given network interface: ifnet_get_local_ports_extended(interface, PF_UNSPEC, INPCB_GET_PORTS_USED_EXTBGIDLEONLY, bitfield). Note that the bitfield parameter may be an $8k$ bit array that is indexed by the port number.

We now describe embodiments of the electronic device. FIG. 4 presents a block diagram illustrating an electronic device 400, such as electronic device 110 in FIG. 1. This electronic device includes processing subsystem 410, memory subsystem 412, networking subsystem 414, and power subsystem 430. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as application or program module 422, or operating system 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that includes one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420. For example, networking subsystem 414 can include a Bluetooth networking system, a cellular networking system (e.g., a 3G/4G network such as UMTS, LTE, etc.), a universal serial bus (USB) networking system, a networking system based on the standards described in IEEE 402.11 (e.g., a Wi-Fi networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices.

Furthermore, power subsystem 430 may include one or more components for providing power to electronic device 400, such as a battery 432 (and, more generally, an energy-storage component). Note that power subsystem 430 may include circuits for charging and, more generally, managing energy storage in battery 432.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections between the subsystems.

In some embodiments, electronic device 400 includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a server, a media player (such as an MP3 player), an appliance, a subnotebook/netbook, a tablet computer, a smartphone, a cellular telephone, a smartwatch, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, power subsystems, and/or display subsystems. Additionally, one or more of the subsystems may not be present in electronic device 400. Moreover, in some embodiments, electronic device 400 may include one or more additional subsystems that are not shown in FIG. 4. For example, electronic device 400 can include, but is not limited to, a data collection subsystem, an audio and/or video subsystem, an alarm subsystem, a media processing subsystem, and/or an input/output (I/O) subsystem. Also, although separate subsystems are shown in FIG. 4, in some embodiments, some or all of a given subsystem or component can be integrated into one or more of the other subsystems or component(s) in electronic device 400. For example, in some embodiments program module 422 is included in operating system 424.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414, such as a radio. Moreover, the integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals, e.g., determining if the received signal includes an advertising frame, etc.)

While a communication protocol compatible with Wi-Fi standards was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 422, operating system 424 (such as a driver for interface circuit 418) or in firmware in interface circuit 418. Alternatively or additionally, at least some of the operations in the communication technique may be implemented in a physical layer, such as hardware in interface circuit 418.

Note that numerical values used in the preceding discussion are for purposes of illustration, and that different values may be used in the embodiments.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A wireless electronic device, comprising:
  an interface circuit configured to communicate application data with another electronic device through a connection;
  a processor; and
  a memory that stores an operating system of the electronic device and an application, wherein, during operation:
    the processor executes the operating system and selectively executes the application;
    after execution of the application by the processor, the application transitions from a runnable mode to a suspended state, and the operating system receives a request from the application to maintain the connection while the application is in the suspended state; and
    in response to the request, the operating system provides an instruction to the interface circuit to maintain the connection for a time interval while the application is in the suspended state, wherein the time interval is set based on at least one of a current power state of a battery included in the electronic device and a current available space within the memory.

2. The electronic device of claim 1, wherein the request specifies a value of a flag to be set on a socket.

3. The electronic device of claim 1, wherein, in response to the processor transitioning to a sleep mode, the processor instructs the interface circuit to maintain the connection by providing a list of maintained connections to the interface circuit.

4. The electronic device of claim 1, wherein, in response to the application transitioning from the suspended state to the runnable mode, the application communicates information through the maintained connection without re-establishing the connection.

5. The electronic device of claim 1, wherein in response to confirming one or more system safeguards, the operating system provides the instruction; and wherein the one or more system safeguards include restricting the application to maintain a single connection.

6. The electronic device of claim 1, wherein in response to confirming one or more system safeguards, the operating system provides the instruction; wherein the time interval is set to a first value in response to the current power state of the battery being above a predetermined threshold, wherein the time interval is set to a second value in response to the current power state of the battery being below the predetermined threshold, and wherein the first value is greater than the second value.

7. The electronic device of claim 1, wherein in response to confirming one or more system safeguards, the operating system provides the instruction; wherein the time interval is set to a first value in response to the current available space within the memory being above a predetermined threshold, wherein the time interval is set to a second value in response to the current available space within the memory being below the predetermined threshold, and wherein the first value is greater than the second value.

8. The electronic device of claim 1, wherein in response to confirming one or more system safeguards, the operating system provides the instruction; and wherein the one or more system safeguards include excluding the connection in response to the connection being associated with a cellular-telephone communication protocol.

9. The electronic device of claim 1, wherein in response to confirming one or more system safeguards, the operating system provides the instruction; and wherein the one or more system safeguards include excluding the connection in response to the application requesting to maintain the connection on behalf of another process executed by the processor.

10. The electronic device of claim 1, wherein the time interval is between 6 and 10 min.

11. The electronic device of claim 1, wherein the electronic device receives and accepts less than a predefined amount of data from the other electronic device via the connection in response to the application being in the suspended state; and wherein the electronic device provides an acknowledgment to the other electronic device for the data without transitioning the application from the suspended state to the runnable mode.

12. The electronic device of claim 11, wherein the electronic device reduces a Transmission Control Protocol (TCP) window size by an amount of the data that is received until the TCP window size is zero.

13. A computer-program product for use in conjunction with a wireless electronic device, the computer-program product comprising a non-transitory computer-readable storage medium and a computer-program mechanism embedded therein to maintain a connection, the computer-program mechanism including:
    instructions for transitioning from a runnable mode to a suspended state;
    instructions for receiving, in response to the transitioning, a request from the application to maintain a connection used by the application to communicate application data with another electronic device, while the application is in the suspended state; and
    instructions for providing an instruction to an interface circuit in the electronic device to maintain the connection for a time interval while the application is in the suspended state, wherein the time interval is set based on at least one of a current power state of a battery included in the electronic device and a current available space within the non-transitory computer-readable storage medium.

14. The computer-program product of claim 13, wherein the request specifies a value of a flag to be set on a socket.

15. The computer-program product of claim 13, wherein, in response to a processor in the electronic device transitioning to a sleep mode, the instructions for providing the instruction include instructions for providing a list of maintained connections to the interface circuit.

16. The computer-program product of claim 13, wherein the computer-program mechanism includes instructions for communicating information through the maintained connection without re-establishing the connection in response to the application transitioning from the suspended state to the runnable mode.

17. The computer-program product of claim 13, wherein the computer-program mechanism includes instructions for confirming one or more system safeguards in response to the request;
    wherein the instruction to the interface circuit is provided in response to the one or more system safeguards being confirmed; and
    wherein the one or more system safeguards include one or more of: restricting the application to maintain a single connection; a power state of the battery in the electronic device; the current available space within the non-transitory computer-readable storage medium; excluding the connection in response to the connection being associated with a cellular-telephone communication protocol; and excluding the connection in response to the application requesting to maintain the connection on behalf of another process executed by a processor in the electronic device.

18. The computer-program product of claim 13, wherein the computer-program mechanism includes instructions for:
    receiving and accepting less than a predefined amount of data from the other electronic device via the connection in response to the application being in the suspended state; and
    providing an acknowledgment to the other electronic device for the data without transitioning the application from the suspended state to the runnable mode.

19. The computer-program product of claim 18, wherein the computer-program mechanism includes instructions for reducing a Transmission Control Protocol (TCP) window size by an amount of the data that is received until the TCP window size is zero.

20. A method for maintaining a connection of a wireless electronic device, wherein the method comprises:

transitioning an application from a runnable mode to a suspended state;

receiving, in response to the transitioning, a request from the application to maintain a connection used by the application to communicate application data with another electronic device, while the application is in the suspended state; and providing an instruction to an interface circuit in the electronic device to maintain the connection for a time interval while the application is in the suspended state, wherein the time interval is set based on at least one of a current power state of a battery included in the electronic device and a current available space of a memory included in the electronic device.

21. The electronic device of claim 1, wherein after the application transitions to the suspended state, the application operates in a background mode such that the application is not runnable by a scheduler.

22. The electronic device of claim 1, wherein after the application transitions to the suspended state, the application operates in a background mode such that the application is unable to interact with an external resource.

* * * * *